Figure 1:
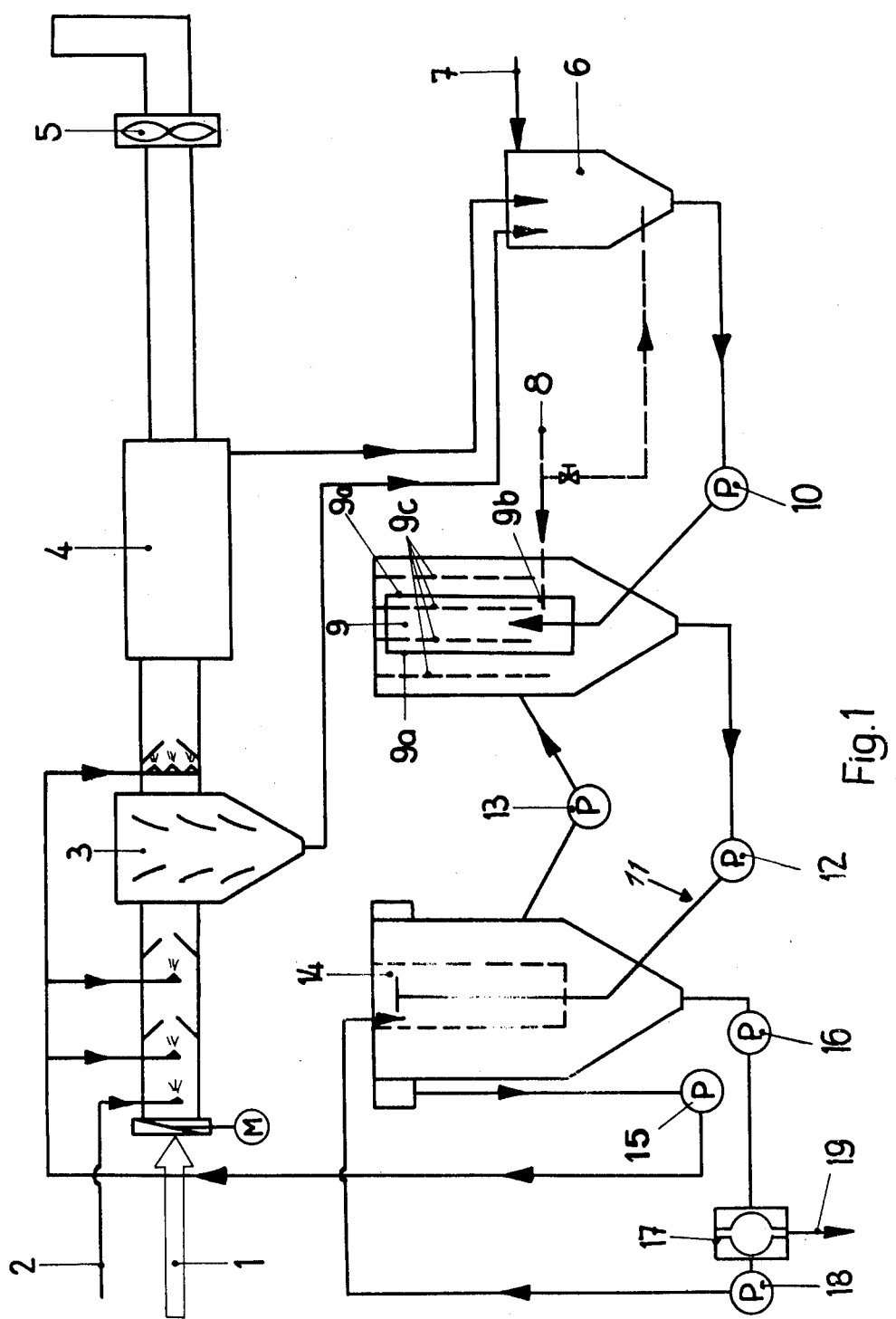

United States Patent [19]

Hölter et al.

[11] 4,080,428

[45] Mar. 21, 1978

[54] PROCESS FOR THE PURIFICATION OF FLUE AND OTHER WASTE GAS

[75] Inventors: Heinz Hölter, 39-41 Beisenstrasse, 439 Gladbeck, Germany; Heinz Gresch, Dortmund-Derne; Heinrich Igelbüscher, Gladbeck, both of Germany

[73] Assignee: Heinz Hölter, Gladbeck, Germany

[21] Appl. No.: 606,785

[22] Filed: Aug. 22, 1975

[30] Foreign Application Priority Data

| Sep. 19, 1974 | Germany | 2444781 |
| Oct. 3, 1974 | Germany | 2447165 |
| Mar. 6, 1975 | Germany | 2509788 |
| Mar. 14, 1975 | Germany | 2511140 |
| May 2, 1975 | Germany | 2519489 |
| May 5, 1975 | Germany | 2519939 |
| Jul. 19, 1975 | Germany | 2532373 |

[51] Int. Cl.$^2$ .................... C01B 17/00; C01F 1/40
[52] U.S. Cl. .................... 423/242; 423/243; 423/166
[58] Field of Search ............ 423/242, 243, 166

[56] References Cited

U.S. PATENT DOCUMENTS

| 2,021,548 | 11/1935 | Goodeve | 423/242 |
| 2,021,936 | 11/1935 | Johnstone | 423/242 |
| 3,556,722 | 1/1971 | Owati | 423/242 |
| 3,632,306 | 1/1972 | Villiers-Fisher et al. | 423/242 |
| 3,808,321 | 4/1974 | Fukui et al. | 423/242 |
| 3,876,750 | 4/1975 | Hauser | 423/242 |
| 3,920,794 | 11/1975 | La Mantia et al. | 423/242 |

*Primary Examiner*—O. R. Vertiz
*Assistant Examiner*—Gregory A. Heller
*Attorney, Agent, or Firm*—Berman, Aisenberg & Platt

[57] ABSTRACT

The invention is concerned with improved process and apparatus for the removal of sulphur dioxide from flue gas or other waste gas of the kind in which the waste gas is scrubbed by a circulating wash liquid containing lime suspensions, i.e. suspensions of calcium oxide, hydroxide or carbonate, the calcium/sulphur compounds so formed being oxidized and removed from the circulation, the improvements of the present invention comprising primarily the freeing of the wash liquid from solid matter before contact with the waste gas and then the control of pH values of the wash liquid at different stages of the circulation to facilitate, for example, the oxidation of the particular calcium/sulphur compound, formed in the scrubbing process, to calcium sulphate, the apparatus also being designed to improve the oxidation step.

26 Claims, 2 Drawing Figures

PROCESS FOR THE PURIFICATION OF FLUE AND OTHER WASTE GAS

The invention relates to a process and an apparatus for the purification of flue gas and other waste gas, which contain sulphur dioxide, in which the gas is brought into contact with a circulating wash liquid, to which calcium carbonate and/or calcium oxide and/or calcium hydroxide is added and the calcium ions in solution in the washing step combine with the sulphur dioxide of the flue gas, and in which the formed calcium-sulphur-compounds are oxidised by means of carbonic acid material to calcium sulphate and are separated from the circulation, wherein salts and/or acids are added, as additives to the circulation, which increase the degree of dissociation of calcium.

According to the state of the art it is known in a sulphur-dioxide wash using milk of lime to increase the utilization factor of lime in that small amounts of an acid, particularly hydrochloric acid, or certain salts, especially calcium chloride, are admixed with the wash liquid circulation. These acids or salts cause more calcium ions to go into solution so that the washing effect is increased. The dissociated calcium ions react substantially more intensively with sulphur dioxide than the calcium compounds of the milk of lime present in suspension. Despite the increased solution of calcium ions the wash liquid, however, contains (in addition to dissociated calcium non-dissociated calcium) compounds, namely: the poorly-soluble calcium carbonate and calcium hydroxide in suspension. These non-dissociated calcium compounds can obstruct the washing apparatus, especially the spraying nozzles, conduits, etc. In addition because of oversupply of non-dissociated calcium compounds and the abundantly present carbonic acid in the crude gas, carbonate incrustations are formed in the washing apparatus; these are prevented only when sufficient acid is set free (in the absorption of sulphur dioxide) to prevent the formation of carbonates or to decompose the carbonate incrustations. This is, however, not always ensured, especially if the sulphur dioxide content of the flue gas is subject to fluctuations, and the oversupply of non-dissociated calcium compounds is large.

The invention is therefore based on the problem of developing a process of the initially-mentioned kind so that carbonate incrustations in the washing apparatus are prevented with absolute security without the intensity of the sulphur dioxide absorption suffering.

For a solution of this problem the invention proposes starting from a process of the initially-mentioned kind characterised in that the washing liquid is freed from solid matter before contact with the gas. Accordingly, since the gas is now washed with a clarified washing liquid contaminated by hardly any solid matter, the nozzles and conduits can no longer be obstructed and carbonate incrustations in the washing apparatus are prevented. Since the clear washing liquid supplied to the washing apparatus nevertheless contains much dissociated calcium, the degree of separation in relation to the state of the art is not impaired. The requisite concentration of dissociated calcium ions is available, on the contrary, through suitable control of the pH value before the washing process. Obviously the wash liquid cannot be freed from all solid particles with technically-reasonably expenditure. The freeing from solid matter takes place to such an extent, however, that a clear washing liquid can be referred to.

If the dissociated calcium ions should still form carbonate incrustations to a small extent in the washing apparatus, this can accordingly be countered by there adding to the washing liquid, as additives, acids and/or salts, the acid residue or radical of which (after combination of the calcium ions of the washing liquid with the sulphur dioxide of the flue gases) forms acids, which can prevent the formation of calcium carbonate and/or can destroy formed calcium carbonate.

Particularly good results are obtained with the process according to the invention when the pH value of the wash liquid is adjusted so high, basically depending on the sulphur dioxide concentration in the flue gas, that the pH value in contact with the flue gas reaches the weakly acid zone but never drops below 4.5. The combining of the sulphur dioxide from the glue gas takes place particularly intensively in the basic and weakly acid zone. In addition there is formed in the weakly acid medium preferably calcium bisulphite and not calcium sulphite, as is the case in most known processes of the prior art, which operate with a suspension of lime. The formation of calcium bisulphite instead of calcium sulphite is extremely advantageous. Calcium bisulphite can easily be oxidised to calcium sulphate which is only difficultly possible with calcium sulphite. Calcium sulphate is practically insoluble in water and can at any time and everywhere be deposited without any precautionary measures. In no case is it dangerous to ground water. The deposition of calcium sulphite is however absolutely forbidden in many districts. At best only so-called arranged deposits of calcium sulphite should take place. These are such deposits in which a penetration of the material dissolved from the deposit into the ground water is prevented. It is a question therein of water-impermeable troughs, for example of synthetic material, which receive the material to be deposited. This expensive deposition of calcium sulphite can be dispensed with through the process according to the invention. Moreover, numerous technical possibilities of use are available for calcium sulphate (gypsum production), which are not available however for calcium sulphite.

Further, the pH value of the wash liquid is adjusted basically before contact with the gas, but not however above 12. With a pH value above 12 the sulphur dioxide washing without incrustation and with formation of calcium bisulphite would no longer function in trouble-free manner. The pH value of 12 thus shows an upper limit for the efficiency of the wash liquid.

Particularly suitable additives for the wash liquid are acids and/or salts of the halogen group, nitrogen or phosphorus, the anions of which form with the calcium ions water-soluble compounds, which in the presence of sulphurous acid permit exchange in neutral or weakly acid medium with the acid residue of sulphurous acid and in an alkaline medium reform the water-soluble calcium compounds. These acids and salts are, as a rule, cheaply available and fulfil their purpose fully and completely. If desired, the additive can also be ammonium salt.

Suitably a carboxylic acid, particularly formic acid, for buffering, is added to the wash liquid before contact with the gas. The addition of such carboxylic acid prevents a too rapid and too intensive lowering of the pH value. Through the buffer action of the carboxylic acid the washing solution thus remains for a relatively long time in a zone favouring the desired formation of calcium bisulphite despite the formation of relatively much mineral acid. In addition the carboxylic acid, especially formic acid, has an inhibitive effect so that the washing apparatus is less attacked by the formed acid.

Preferably the wash liquid, with a sulphur dioxide concentration in the flue gas of 2,000 to 3,000 mg/Nm$^3$, contains 0.25% hydrochloric acid and about 0.1% formic acid. With these values there results with the lowest water factor an extremely intensive purification of the flue gas from sulphur dioxide.

Preferably there is additionally added to the wash liquid before contact with the flue gas a carboxylic acid, which has an inhibitive action on the compound product or products. In this way the washing apparatus will be additionally protected against attack from the resulting acids. A carboxylic acid with an aldehyde character is preferably used as the carboxylic acid having an inhibitive action.

Alternatively, in the process according to the invention there can be used in place of a mineral acid, or a mineral acid with carboxylic acid additive, a purely organic acid, preferably a carboxylic acid and/or its salts, the radicals of which form with the calcium ions water-soluble compounds, which in the presence of sulphurous acid in neutral or weakly acid medium allow exchange with the acid residue of the sulphurous acid and in alkaline medium reform the water-soluble calcium compounds.

The use of these organic acids and/or salts has the advantage that the desired by-product, calcium sulphate (gypsum), can be particularly purely produced and not be contaminated, or only slightly contaminated, with harmful halogenides, nitrates or phosphates.

Especially good results are obtained when only formic acid is used as additive. With this the washing effect is substantially greater than with the use of other additives. In addition formic acid, as already stated above, has an inhibitive character so that the washing apparatus is only slightly attacked.

If desired the ammonium salt of formic acid can be the additive. This also gives a very good degree of efficiency and only slight contamination of the by-product gypsum.

In order to obtain a rapid oxidation to calcium sulphate of the calcium bi-sulphite formed in the washing, the pH value during the oxidation of the formed calcium bi-sulphite to calcium sulphate lies in the acid region, particularly between 4.5 and 6.5.

During the separation of solid matter the washing liquid must on the contrary be neutral or slightly basic. For this reason the addition of calcium oxide, calcium hydroxide and/or calcium carbonate takes place after the oxidation and before the solids separation in such a way that the pH value during the separation of the solid matter lies in the basic zone. Accordingly the dwell time of the wash liquid before the solids separation amounts to at least 15 minutes. This time is necessary so that an extensive oxidation can occur and sufficiently large particles result from the separation.

The oxidation can surprisingly be strongly accelerated by the presence of iron as catalyst. In order that the consumption of catalyst material and the contamination of the by-product gypsum by iron is avoided, the iron element serving as catalyst preferably consists of refined steel or copper alloy steel.

The oxidation can also be accelerated in that alkaline salts, particularly ferric chloride or ferric sulphate are added to the washing liquid during the oxidation. Such alkaline salts occur as waste material in steel works and are available because of this cheaply and in large amounts.

In order to bring the by-product gypsum, obtained in the solids separation with about 99% purity, to a pure gypsum form of about 100% purity, the separated sludge from the solids separation is washed for at least half-an-hour with sulphuric acid. Air is blown into the sludge during this washing wherein the sulphur dioxide carried out is led anew to the flue gas purification.

Although in the process according to the invention carbonate incrustation can be almost completely avoided, calcium sulphate deposition can gradually occur in the washing apparatus which obstructs the washing apparatus. According to the invention it is further proposed therefore, that two separate, parallel connected drip tubes of the washing apparatus be charged alternately with flue gas and a calcium sulphate dissolving wash liquid. This wash liquid dissolves the calcium sulphate deposited in one of the two drip tubes, while the other drip tube is charged with flue gas.

The calcium sulphate dissolving wash liquid is suitably a hydrochloric acid washing solution with a pH value below 4.5, which is fed into the circulation through a separate container and then injected into the washing circulation. Such a washing solution led into the circulation can dissolve the total deposited calcium sulphate. The used washing solution is employed for covering calcium chloride losses and brings additional chlorine ions into the wash liquid circulation, so that it can save the further addition of hydrochloric acid. In addition in this way no effluent harmful to the environment results. Alternatively, the calcium sulphate dissolving wash liquid may be an ammonium sulphate solution, which subsequently is delivered to a special use, particularly a production of fertiliser. Ammonium sulphate forms, with the deposited calcium sulphate, the double salt $CaSO_4.(NH_4)_2SO_4.H_2O$ which is readily soluble and permits easy processing to fertilisers.

An important step of the process according to the invention consists in the oxidation of the dissociated calcium bi-sulphite, formed in the flue gas washing, to calcium sulphate, wherein a calcium sulphate suspension accessible to simple clarification must arise. The prerequisite for this is an extremely intensive mixing with air of the wash liquid flowing out of the washing apparatus. The apparatus for carrying out the process therefore provides, for the oxidation of the wash liquid, an oxidation vessel, in which is arranged at least one vertically disposed pipe, open at the top and bottom, air injection spray nozzles being arranged at its lower end. The washing liquid is driven through this pipe because of the air-lift pump effect resulting from the air injection. The pipe draws in wash liquid continuously at its lower end and delivers wash liquid from its upper end, so that an intensive circulation takes place in the oxidation vessel.

Alternatively, the oxidation vessel has several pipes open at both ends with the lower ends deeply immersed in the liquid, constricting pieces opening upwardly being arranged at the upper ends, into which is injected by means of injector nozzles wash liquid drawn off from below the oxidation vessel by means of a pump. There thus results in the region of the constricting pieces an aspirator effect, through which relatively much air is entrained, which is very intensively mixed with the wash liquid, discharged at the lower end of the pipe and subsequently again ascending upwardly in the oxidation vessel. There can be additionally connected at the inlet tube to the injector nozzles an air inlet tube connected to an air compressor. Thus the liquid stream coming from the injector nozzles is already mixed with air.

The clarification of the wash liquid suitably takes place in a double-jacketed gravity separator, which is arranged behind the oxidation vessel and in front of the flue gas washer, wherein between the oxidation vessel and the double-jacketed gravity separator a feed device for the lime addition is arranged. Such a double-jacketed gravity separator makes possible relatively rapidly the separation of the solid materials (oxidised calcium sulphate, any existing excess of lime and non-lime containing materials) contained in the wash liquid, whereby a sufficient clear wash liquid results.

Preferably the lime addition device is automatically controlled, depending on the pH value of the wash liquid coming from the flue gas washer, in such a way that the added amount of lime is increased on depression of the pH value of the wash liquid coming from the flue gas washer to a value below 4.5. This automatic control also provides that the pH value before the contact with the flue gas is sufficiently high so that the pH value after contact with the flue gas does not drop below the lower limiting value.

The pH value should in any case not be permitted to rise above 12 before the contact with the flue gas, since otherwise a trouble free washing out of the sulphur dioxide without incrustation and with formation of calcium bi-sulphite from the flue gas would no longer be ensured. On this ground the apparatus for carrying out the process of the invention is provided with a supply device, connected to the wash circulation, for an additive for increasing the dissociation of lime, wherein the supply device for the additive is automatically controlled depending on the pH value of the wash liquid delivered to the flue gas washer in such a way that the added amount of additive is increased on increase of the pH value above 12.

Figure 2:
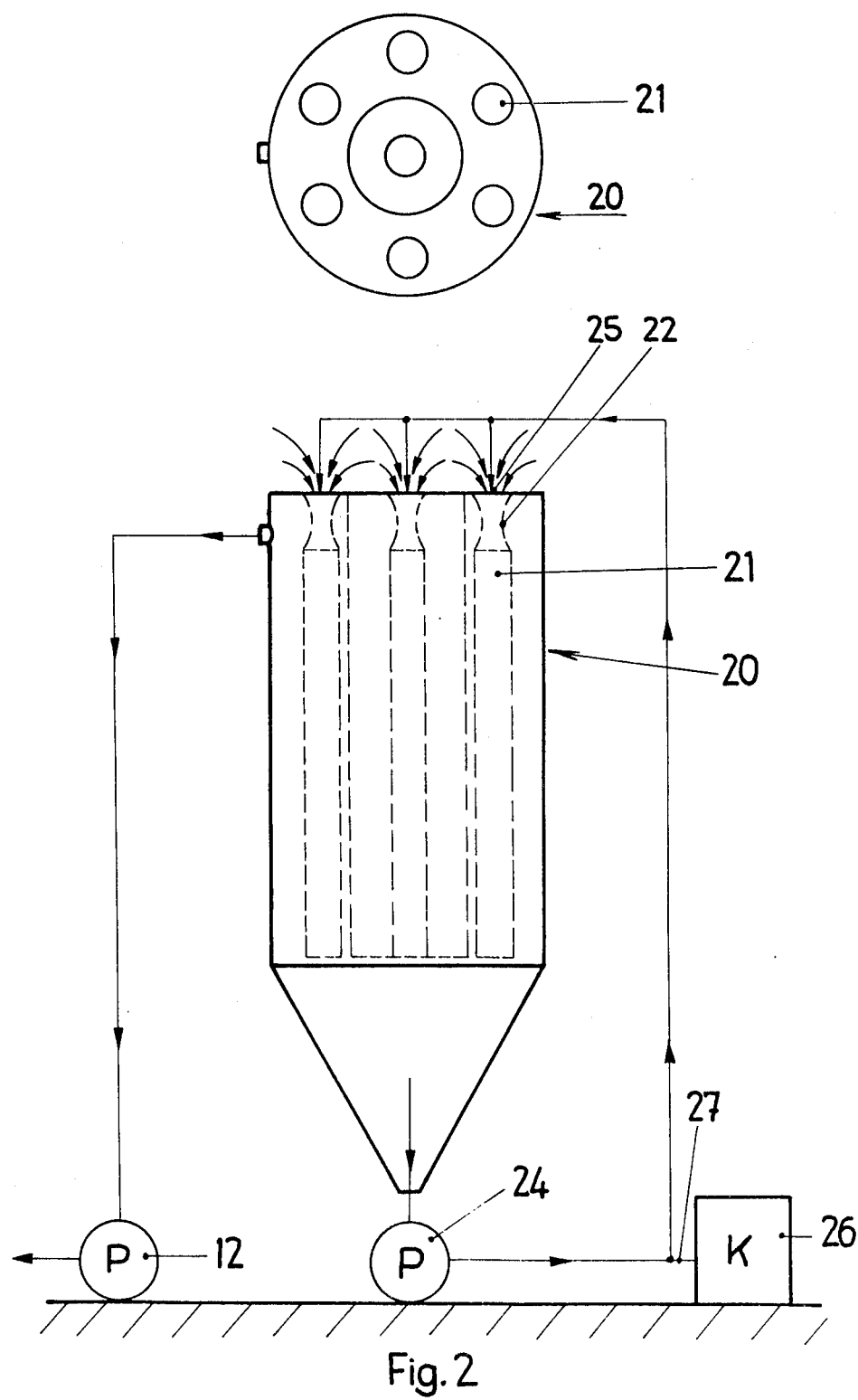

An embodiment of the invention is described below in more detail with reference to the drawing in which FIG. 1. shows schematically a typical wash circulation according to the invention and FIG. 2 shows a particular embodiment of the oxidation vessel.

In the drawing the flue gas stream is indicated by reference numeral 1 and enters the washing apparatus through a shut-off member M. A fresh water nozzle 2 is arranged in the washing apparatus, through which is continually supplied to the wash circulation so much water as is lost through evaporation and with the by-product gypsum. In addition the water coming from the fresh water nozzle 2 serves for the first cooling of the flue gas. Behind the fresh water nozzle 2 the washing apparatus proper commences in which the flue gas stream is sprayed with the clear wash solution. A first and second wash stage are indicated by reference numerals 3 and 4. The pressure gradient required for the flue gas stream is provided by a fan 5.

The wash liquid, charged with calcium bi-sulphite and other flue gas associated materials from the wash stages 3 and 4, is then fed to a dip tank 6. The additives are introduced at 7 into this dip tank 6. With regard to these additives it is a question of a suitable acid or a suitable salt of the earlier explained kind. In addition an air connection 8 opens into the dip tank 6, providing for the essential mixing.

From the dip tank 6 the wash liquid passes into an oxidation vessel 9 through the intermediary of a pump 10. In the oxidation vessel is arranged at least one pipe 9a standing vertically and open at top and bottom, at the lower ends of which are arranged air injector nozzles 9b which are supplied with compressed air through the air connector 8. The ascending air develops in the pipe 9a an air-lift pump effect, through which the liquid column ascends in the pipe 9a and draws in new liquid at the lower end of the pipe 9a. Through the air-lift pump effect in the pipe 9a there thus results an intensive circulation and mixing with air of the wash liquid in the oxidation vessel 9.

The air introduced into the oxidation vessel 9 effects an oxidation of the dissociated calcium bi-sulphite, present in the wash liquid, to calcium sulphate. For acceleration of the oxidation several rods 9c of refined steel or copper alloy steel are suspended in the oxidation vessel 9 and act as catalysts. The wash liquid from the oxidation vessel 9 now charged with calcium sulphate proceeds to a double-jacketed gravity separator 14. In front of the double-jacketed gravity separator 14 the wash liquid is supplied continually by means of a feed device 11 with milk of lime (suspension of calcium carbonate, calcium oxide or calcium hydroxide), whereby the pH value of the wash liquid in the separator 14 is increased. The separator 14 is furthermore connected with the oxidation vessel 9 through a pump 13. So much alkaline liquid is fed continually to the oxidation vessel 9 through the pump 13 that the pH value in the oxidation vessel 9 remains continually between about 4.5 and 6.5.

The milk of lime supply 11 is so controlled that it regulates a pH value of 12 maximum in the double-jacketed gravity separator 14. The control takes place, dependent on the pH value of the wash liquid flowing out of the washing apparatus, in such a way that the pH value of the wash liquid flowing out of the washing apparatus does not fall below 4.5. In case in this control the pH value in the double-jacketed gravity separator 14 is obliged to exceed 12, then first of all at 7 more additives in the form of suitable acids or salts are added to the wash liquid, which increase the dissociation of calcium and/or the buffer action of the wash solution. Only when these possibilities for influencing the pH value of the wash liquid flowing from the washing apparatus have been completely exhausted is the water factor, that is the amount of liquid per cubic meter of flue gas, increased.

The most extensively clarified liquid in the double-jacketed gravity separator 14 is supplied anew by means of a pump 15 to the nozzles of the washing stages 3 and 4. The solids discharge of the double-jacketed gravity separator 14 is put through pump 16 to a centrifuge 17, in which the remaining liquid is separated from the solid materials. The liquid separated in the centrifuge 17 is supplied anew by means of pump 18 to the double-jacketed gravity separator 14. The solid of the solids residue 19 from the centrifuge 17, which consists essentially of calcium sulphate, can, in order to produce the purest gypsum, be subjected to washing with sulphuric acid, in which solids deposited with the calcium sulphate are washed out. In addition in this washing any calcium sulphite present is chemically converted to calcium sulphate. The washing with sulphuric acid takes place with a continuous blowing in of air. The gas, extracted by the air, which can contain inter alia sulphur dioxide, is supplied anew to the flue gas purification.

In FIG. 2 there is illustratred a second embodiment of the oxidation vessel. This oxidation vessel, generally indicated by reference numeral 20, is provided with several pipes 21 open at both ends with the lower ends deeply immersed in the liquid, the tubes serving as iron catalysts, the upper ends opening upwardly and having constricting pieces 22 arranged there into which the wash liquid, drawn off from below the oxidation vessel 20 by means of a pump 24, is injected through injector nozzles 25. The liquid jets injected into the constriction pieces 22, like an injector pump draw relatively much air with them, so that an intensive mixing between air and liquid occurs. The mixture of air and liquid coming out from below the tubes 21 again rises between the tubes 21 so that a good circulation thus occurs. In addition at the inlet tube to the injector nozzles 25 there can be connected an air inlet tube 27 connected to an air compressor 26. In this case there takes place additionally a thorough mixing of air and liquid before the injector nozzles 25.

The course of the chemical reactions in the desulphurising of flue gas according to the invention is explained below with reference to one example:

The $SO_2$ — total yield amounts to about 325 kg $SO_2$/h
The wash liquid circulation amounts to 130 m$^3$/h at 53° C
The lime consumption amounts to about 300 kg/h (95% CaO)

1. Solubility of $Ca(OH)_2$ in water.
   1 liter of water dissolves about 1g $Ca(OH)_2$ at 53° C.
   At 130 m$^3$ circulation liquid/h this gives about 130 kg $Ca(OH)_2$/h
2. Result of reaction.
   $Ca(OH)_2 + SO_2 \rightarrow CaSO_3 + H_2O$ (pH above 7) -calcium sulphite
   $CaSO_3 + H_2SO_3 \rightarrow Ca(HSO_3)_2$ (pH under 7) - calcium bi-sulphite
3. According to this course of reaction 230 kg $SO_2$/h were combined.
4. The residue of 95 kg SO is combined with Ca $Cl_2$ present in solution.
   $CaCl_2, 6H_2O + 2H_2SO_3 \rightarrow Ca(HSO_3)_2 + 2HCl$ (pH under 7) $\rightarrow$ Calcium bi-sulphite and hydrochloric acid.
   56 kg HCl are accordingly set free. This corresponds to 0.43g HCl/l of wash water in 130 m$^3$ of circulating quantity/h. This regulates a pH value of 2.0 to 3.0.
5. Neutralisation by addition of $Ca(OH)_2$.
   $2HCl + Ca(OH)_2 \rightarrow CaCl_2 \cdot 6H_2O + 2H_2O$
6. $Ca(HSO_3)_2 + O_2 \rightarrow CaSO_4 \cdot 2H_2O + H_2SO_4 \rightarrow$ Oxidation to calcium sulphate with formation of sulphuric acid.

Reactions by addition of 0.1 to 0.2% formic acid.
   $2H\ COOH + Ca(OH)_2 \rightarrow Ca(COOH)_2 + 2H_2O$
   $2H\ COOH + CaO \rightarrow Ca(COOH)_2 + H_2O$
   $Ca(COOH)_2 + 2H_2O + 2SO_2 \rightarrow Ca(HSO_3)_2 + 2HCOOH$
   $Ca(HSO_3)_2 + O_2 \rightarrow CaSO_4 \cdot 2H_2O + H_2SO_4$
   $2HCOOH + Ca(OH)_2 \rightarrow Ca(COOH)_2 + 2H_2O$ As noted above under point 4 small quantities of hydrochloric acid set free permit the pH value to drop very rapidly in the direction of pH 2 or 3. With these pH values no absorption of $SO_2$ is to be anticipated.

According to the $SO_2$ content of the flue gas a corresponding water factor (Liter $H_2O$/Nm$^3$) must be selected, in order that the pH 4.5 in the outflowing wash liquid is not lowered, accordingly a maximum washing out of the $SO_2$ from the flue gas is maintained.

An addition of 0.1 to 0.2% formic acid makes possible through stronger utilisation of the calcium ions in the wash liquid a considerable lowering of the water factor.

Through the action of the formic acid there results, on the basis of the 0.1 to 0.2% addition, a buffer solution as wash liquid. Through the buffering of the hydrochloric acid freed from the $CaCl_2$, a very rapid lowering of the pH value is prevented especially in the pH range 6.9–5 up to almost pH 4.5. The pH value is even held for a considerably long period between 5.5 to 6.2 and accordingly a greater utilisation of the introduced calcium ions is ensured.

With a pH of 4.5 a 100% $SO_2$ absorption from the flue gas is possible. The stated characteristics are still more significant when 0.1 to 0.3% of formic acid (as calcium formate) alone is added to the wash liquid. By the addition of hydrochloric and formic acids a maximum utilisation of lime in the $SO_2$ washing is ensured.

The washing apparatus 3, 4 can, in a manner not illustrated in detail, especially in the region of the drip separator, be formed as a double path. In this one of the paths is always washed with a freshly prepared wash solution, while the other is charged with flue gas. As regards the wash solution it is a question either of a hydrochloric acid solution with pH< 4.5, which after use is put at 7 into the washing medium circulation, or alternatively it is a question of an ammonium sulphate solution, which separated is supplied to a special fertiliser production.

We claim:

1. A process for purifying sulphur-dioxide-containing waste gas comprising:
   a. contacting the gas with circulating calcium-ion containing wash liquid, the wash liquid being only clarified wash liquid having a pH from a maximum initial pH of 12 to a minimum subsequent pH in the weakly-acid zone,
   b. adding to the gas-contacted circulating wash liquid acid or salt ingredient means to increase the degree of calcium-ion dissociation therein,
   c. oxidizing calcium bisulphite in the ingredient-means-containing circulating wash liquid to calcium sulphate at a pH of at least 4.5,
   d. adding to the thus-oxidized circulating wash liquid a sufficient amount of a substance selected from the group consisting of calcium carbonate, calcium oxide and calcium hydroxide to form calcium-sulphur compounds from components in the circulating wash liquid and to provide said circulating wash liquid with calcium ions for step (a), and
   e. clarifying the circulating wash liquid before contacting the sulphur-dioxide-containing waste gas therewith.

2. A process according to claim 1 wherein the weakly-acid zone of step (a) has a minimum pH of 4.5 and which further comprises separating solids from the clarified wash liquid of step (e).

3. A process according to claim 1 wherein the waste gas is flue gas and which comprises regulating the pH value of the wash liquid so that said pH value in contact with the flue gas is in the acid range but is not below 4.5.

4. A process according to claim 3 which comprises adjusting the pH value of the wash liquid to a basic value which does not exceed 12 before contacting it with the flue gas.

5. A process according to claim 1 wherein the ingredient means added to increase the degree of discoloration of calcium is an acid selected from the group consisting of halogen, nitrogen and phosphorous acids or a salt thereof, the anion of which forms, with calcium ions, water-soluble compounds which, in the presence of sulphurous acid, permit exchange in neutral or weakly-acid medium, with the acid residue of sulphurous acid and, in an alkaline medium reform water-soluble calcium compounds.

6. A process according to claim 1 comprising additionally adding a carboxylic acid buffer to the wash liquid before contacting the latter with the waste gas.

7. A process according to claim 6 wherein the calcium-sulphur-compound forming substance added to the circulating wash liquid is calcium carbonate and the means to increase the degree of calcium-ion dissociation comprises hydrochloric acid.

8. A process according to claim 6 wherein the calcium-sulphur-compound forming substance added to the circulating wash liquid is calcium oxide and the means to increase the degree of calcium-ion dissociation comprises hydrochloric acid.

9. A process according to claim 6 wherein the calcium-sulphur-compound forming substance added to the circulating wash liquid is calcium hydroxide and the means to increase the degree of calcium-ion dissociation comprises hydrochloric acid.

10. A process according to claim 1 wheren the wash liquid contains 0.25% of hydrochloric acid and about 1% of formic acid when the flue gas has a sulphur-dioxide concentration of from 2,000 to 3,000 mg/Nm$^3$.

11. A process according to claim 1 wherein the ingredient means to increase the degree of dissociation of calcium is an organic acid or salt thereof, radicals of which form, with calcium ions, water-soluble compounds which, in the presence of sulphurous acid, permit exchange in neutral or weakly acid media with the acid residue of sulphurous acid and, in an alkaline media reform water-soluble calcium compounds.

12. A process according to claim 11 wherein the ingredient means is formic acid.

13. A process according to claim 11 wherein the ingredient means is ammonium formate.

14. A process according to claim 1 which comprises oxidizing calcium bisulphite, formed during washing of the flue gas, to calcium sulphate at an acid pH.

15. A process according to claim 4 wherein the acid pH is between 4.5 and 6.5.

16. A process according to claim 1 which comprises adding the substance selected from the group consisting of a calcium carbonate, calcium oxide and calcium hydroxide after oxidizing the calcium bisulphite and before clarifying the circulating wash liquid at a basic pH.

17. A process according to claim 16 which comprises maintaining the wash liquid for a dwell time of at least 15 minutes before separating solids therefrom.

18. A process according to claim 1 wherein oxidizing the calcium-bisulphite is effected catalytically with elemental iron as catalyst.

19. A process according to claim 18 wherein the elemental iron catalyst is in refined-sheet form or in copper-alloy-steel form.

20. A process according to claim 1 wherein oxidizing the calcium-bisulphite to calcium sulphate is effected with wash liquid containing an alkaline salt.

21. A process according to claim 20 wherein the alkaline salt is iron chloride or iron sulphate.

22. A process according to claim 1 which comprising washing sludge from solid materials freed from said wash liquid for at least half-an-hour with sulfuric acid.

23. A process according to claim 22 which comprises blowing air into the sludge while washing it with sulphuric acid and recirculating entrained sulphur dioxide to the waste gas being purified.

24. A process according to claim 1 which comprises alternately feeding flue gas and wash liquid which dissolves calcium sulphate to two separate drip tanks of wash apparatus connected in parallel.

25. A process according to claim 24 which comprises leading the wash liquid which dissolves calcium sulphate through a separate tank into circulating wash liquid, the wash liquid which dissolves calcium sulphate containing hydrochloric acid and having a pH value below 4.5.

26. A process according to claim 24 wherein the wash liquid which dissolves calcium sulphate is an ammonium sulphate solution.

* * * * *